(12) United States Patent
Bastide et al.

(10) Patent No.: US 10,326,885 B2
(45) Date of Patent: Jun. 18, 2019

(54) UTILIZING CALLER WAIT TIME TO CREATE SOCIAL MESSAGE

(71) Applicant: International Business Machines Corporation, Armonk, NY (US)

(72) Inventors: Paul R. Bastide, Boxford, MA (US); Matthew E. Broomhall, Goffstown, NH (US); Thomas J. Evans, IV, Cary, NC (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/968,619

(22) Filed: May 1, 2018

(65) Prior Publication Data

US 2018/0255181 A1    Sep. 6, 2018

Related U.S. Application Data

(63) Continuation of application No. 15/431,259, filed on Feb. 13, 2017.

(51) Int. Cl.
*H04M 3/00* (2006.01)
*H04M 3/523* (2006.01)
(Continued)

(52) U.S. Cl.
CPC .......... *H04M 3/5238* (2013.01); *H04L 51/32* (2013.01); *H04L 67/306* (2013.01);
(Continued)

(58) Field of Classification Search
CPC .............................. H04M 3/5238; H04L 51/32
(Continued)

(56) References Cited

U.S. PATENT DOCUMENTS 5,996,007 A    11/1999 Klug et al.
2009/0225970 A1    9/2009 Grigsby et al.
(Continued)

FOREIGN PATENT DOCUMENTS

WO    2013014679 A1    1/2013
WO    2013043423 A1    3/2013
WO    2014093180 A1    6/2014

OTHER PUBLICATIONS

List of IBM Patents or Patent Applications Treated as Related, May 2, 2018, pp. 1-2.

*Primary Examiner* — William J Deane, Jr.
(74) *Attorney, Agent, or Firm* — Robert A. Voigt, Jr.; Winstead, P.C.

(57) ABSTRACT

A method, system and computer program product for utilizing a caller wait time. When the caller's estimated wait time exceeds a threshold amount of time, an interactive voice response (IVR) system retrieves information (e.g., caller's previous purchases) about the caller. The IVR system then initiates a dialog with the caller to determine their experience with a product or service by prompting the caller with questions derived from the retrieved information. After recording the responses by the caller to the questions, the IVR system generates social media content based on the caller's responses. The IVR system then converts the text of the generated social media content to an audible version, which is provided to the caller to approve the posting of the social media content. The social media content is posted on a social media stream in response to the caller approving the posting of the social media content.

20 Claims, 4 Drawing Sheets

(51) Int. Cl.
*H04L 12/58* (2006.01)
*H04L 29/08* (2006.01)
*H04M 3/42* (2006.01)
*H04M 3/51* (2006.01)

(52) U.S. Cl.
CPC ..... *H04M 3/42068* (2013.01); *H04M 3/5166* (2013.01); *H04M 2203/655* (2013.01)

(58) Field of Classification Search
USPC ....... 379/265.01–265.14, 266.01–266.1, 309
See application file for complete search history.

(56) References Cited

U.S. PATENT DOCUMENTS

| | | |
|---|---|---|
| 2013/0129075 A1 | 5/2013 | Whitaker |
| 2014/0270105 A1 | 9/2014 | Tamblyn et al. |
| 2014/0355748 A1 | 12/2014 | Conway et al. |
| 2015/0134404 A1 | 5/2015 | Gustafson et al. |
| 2015/0163358 A1 | 6/2015 | Klemm et al. |
| 2015/0206092 A1 | 7/2015 | Erhart et al. |
| 2015/0256676 A1 | 9/2015 | Famous |
| 2016/0105545 A1 | 4/2016 | Filonov et al. |
| 2016/0203566 A1 | 7/2016 | Kataria et al. |
| 2016/0267422 A1 | 9/2016 | Kothadiya et al. |
| 2017/0208177 A1 | 7/2017 | Conway et al. |

UTILIZING CALLER WAIT TIME TO CREATE SOCIAL MESSAGE

TECHNICAL FIELD

The present invention relates generally to interactive voice response systems, and more particularly to utilizing the caller wait time to create a social message pertaining to a product or service of the provider of the interactive voice response system.

BACKGROUND

An interactive voice response system (IVR) is a technology that allows a computer to interact with humans through the use of sound and input from a keypad. IVR systems are commonly employed to service high call volumes as it enables a component to direct received calls to an appropriate location. In response to a received call, the IVR is known to present the caller with a menu of options, known as a tree, and the caller must navigate through the tree with one or more responses. IVR systems can be used for mobile purchases, banking payments and services, retail orders, utilities, travel information and weather conditions.

Call centers may use IVR systems to identify and segment callers. The ability to identify customers allows services to be tailored according to the customer profile. At times, the caller can be given the option to wait in the queue. This wait time or hold time is a loss of time for both the caller and the provider of the IVR system (e.g., company). For example, a caller may be attempting to reach a company representative regarding a product or service sold by the company. During the time that the caller is waiting to speak with a company representative, valuable time is wasted for both the caller and the company resulting in a loss of opportunity for the provider of the IVR system to gain valuable information about the provider's or competitor's products or services.

If, however, the caller waiting time could be utilized by the provider of the IVR system to learn more about the provider's or competitor's products or services, then the caller waiting time would not be a missed opportunity for the provider of the IVR system.

SUMMARY

In one embodiment of the present invention, a method for utilizing a caller wait time comprises detecting an incoming call by a caller. The method further comprises identifying the caller based on a phone number of the incoming call. The method additionally comprises determining an estimated wait time when the caller is placed on hold based on a number of callers placed in queue, a number of service representatives to assist callers and/or an average amount of time previous callers have waited to be serviced. Furthermore, the method comprises retrieving information about the caller in response to the estimated wait time exceeding a threshold amount of time. Additionally, the method comprises initiating a dialog with the caller to determine their experience with a product or service by prompting the caller with questions derived from the retrieved information. In addition, the method comprises recording responses by the caller to the questions. The method further comprises generating social media content based on the caller's responses to the questions. The method additionally comprises providing the caller an audible version of the social media content. Furthermore, the method comprises posting the social media content on a social media stream in response to the caller approving the posting of the social media content after listening to the audible version of the social media content.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for utilizing a caller wait time. In one embodiment of the present invention, an interactive voice response (IVR) system detects an incoming call by a caller. The caller is identified based on the phone number of the incoming call. The IVR system determines an estimated wait time after the caller has been placed on hold. If the estimated wait time exceeds a threshold amount of time, the IVR system retrieves information about the caller. Such information may pertain to the caller's previous purchases of products or services sold by the provider of the IVR system or competitors of the provider of the IVR system. The IVR system then initiates a dialog with the caller to determine their experience with a product or service by prompting the caller with questions derived from the retrieved information. After recording the responses (audio responses) by the caller to the questions, the IVR system converts the recorded responses to text to be used to generate social media content based on the caller's responses to the questions. The IVR system then converts the text of the generated social media content to speech which is used to generate an audible version of the social media content, which is provided to the caller to approve the posting of the social media content on a social media stream. The social media content is posted on a social media stream in response to the caller or group of users approving the posting of the social media content. In this manner, the caller's waiting time is utilized to gain valuable information about the provider's (or competitor of the provider) products or services, which is used to generate social media content that is posted on a social media stream for the benefit of the provider of the IVR system and the customers or potential customers of the provider of the IVR system.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
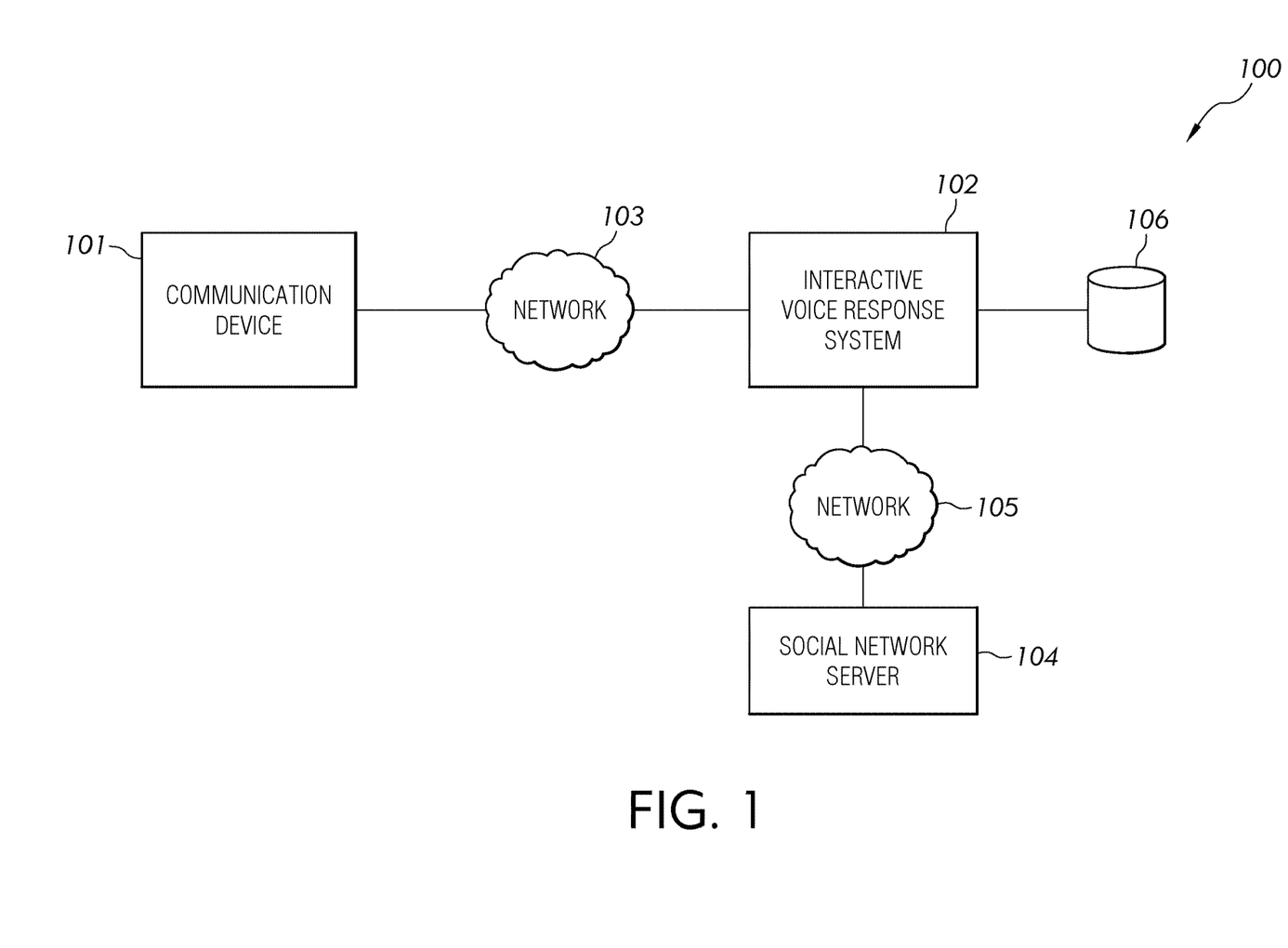
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a communication device 101 connected to an interactive voice response system (IVR system) 102 via a network 103.

Communication device 101 may be any telephonic device, such as a telephone, a cellular phone, a satellite phone, a portable computing unit, a Personal Digital Assistant (PDA), a mobile phone and the like configured with the capability for performing communications between the communication device 101 and IVR system 102. Communication device 101 may have various inputs/outputs with which the user (caller) may interact to provide and receive audio, text, video, and other forms of data. It is noted that both communication device 101 and the user (caller) of communication device 101 may be identified with element number 101.

Interactive voice response system 102 is configured to support voice commands and voice information using text-to-speech processing and natural language processing by using scripts that are pre-programmed for the voice site, for example, voice-extensible markup language (VoiceXML) scripts. IVR system 102 interacts with the customer (caller or user of communication device 101) by using audible commands to prompt the customer 101 to provide information and enabling the customer 101 to input the information by speaking into the voice communication device 101 or by pressing buttons on communication device 101 (when using, for example, a touch-tone telephone). The information input by the customer 101 is conveyed to IVR system 102 over a voice communications session that is established between communication device 101 and IVR system 102 when the call is connected. Upon receiving the information, IVR system 102 processes the information using the pre-programmed scripts. IVR system 102 may be configured to send audible responses back to the customer of communication device 101 via network 103.

IVR system 102 is further configured to utilize the caller waiting time for the provider of IVR system 102 to gain valuable information about the provider's or competitor's products or services. Such valuable information may be used to generate social media content which is posted on a social media stream for the benefit of the provider of IVR system 102 and the customers or potential customers of the provider of IVR system 102 as discussed further below. A description of the hardware configuration of IVR system 102 is provided below in connection with FIG. 2.

Network 103 may include a circuit-switched voice or data network, a packet-switched voice or data network, or any other network able to carry voice and/or data, for example, Internet Protocol (IP)-based or asynchronous transfer mode (ATM)-based networks, including wired or wireless networks. Network 103 may be configured to handle voice traffic, for example, Voice over IP (VOIP) network. Network 103 also may be configured to handle web traffic, such as hypertext transfer protocol (HTTP) traffic and hypertext markup language (HTML) traffic. Network 103 may also include the Internet, Wide Area Networks (WANs), Local Area Networks (LANs), analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network, such as an intranet, radio, television, cable, satellite, and/or any other delivery or tunneling mechanism for carrying data, or any appropriate combination of such networks.

Furthermore, as shown in FIG. 1, communication system 100 may include a social network server 104 connected to IVR system 102 via network 105 (or alternatively, network 103). Social network server 104 may be a web server configured to offer a social networking and/or microblogging service, enabling the user of communication device 101 to send and read other users' posts, as well as enabling IVR system 102 to post social messages on social media streams. "Posts" or "social messages" or "social media content," as used herein, include any one or more of the following: text (e.g., comments, sub-comments and replies), audio, video images, etc. Social network server 104 is connected to network 105 by wire or wirelessly. While FIG. 1 illustrates a single social network server 104, it is noted for clarity that multiple servers may be used to implement the social networking and/or microblogging service.

Additionally, system 100 may include a database 106 connected to IVR system 102. In one embodiment, database 106 is configured to store profiles of the customers of the provider of IVR system 102, which includes information, such as the name, address, phone number, purchase history, social networking websites used by the caller, etc.

System 100 is not to be limited in scope to any one particular network architecture. System 100 may include any number of communication devices 101, IVR systems 102, networks 103, 105 and social network servers 104. Furthermore, system 100 may include a single network, such as network 103 as opposed to multiple networks, such as networks 103, 105.

Figure 2:
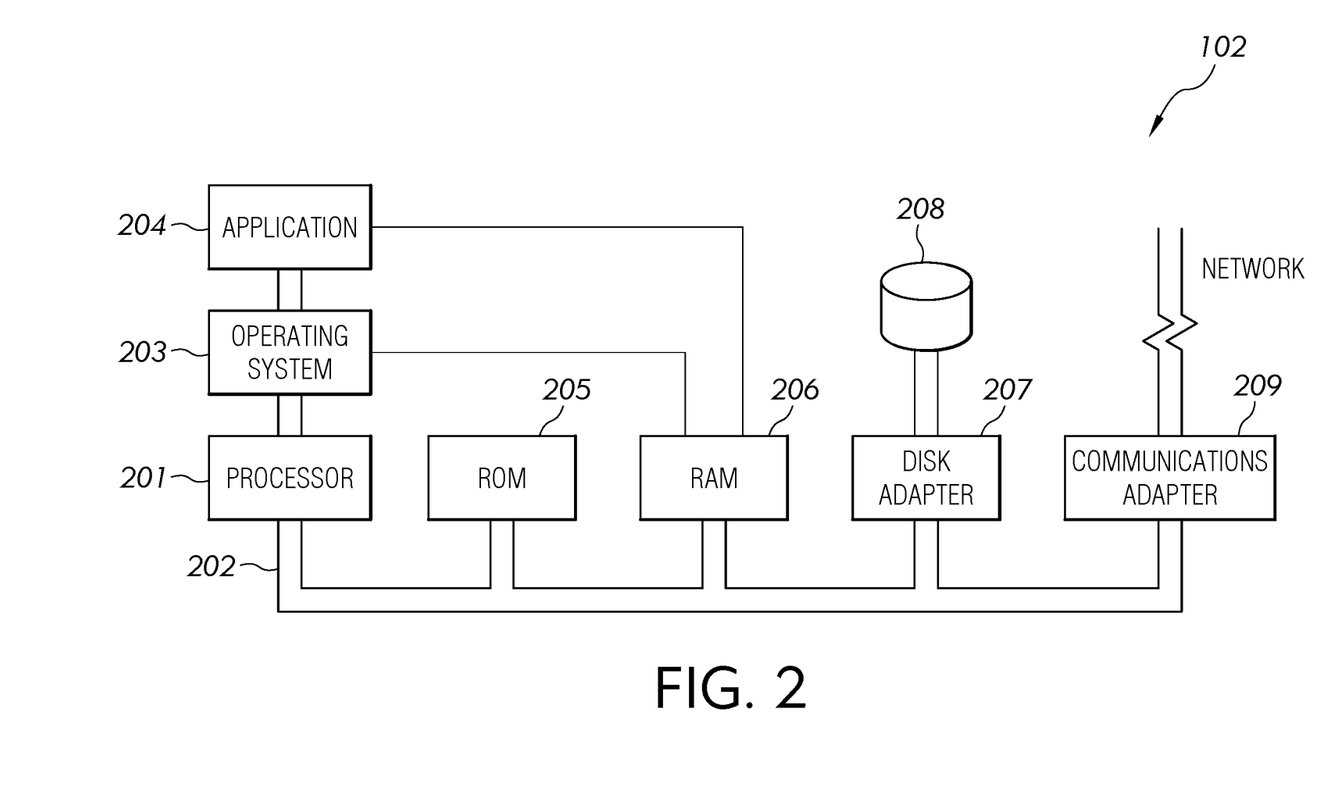
FIG. 2 illustrates a hardware configuration of an interactive voice response (IVR) system which is representative of a hardware environment for practicing the present invention.

Referring now to FIG. 2, FIG. 2 illustrates an embodiment of the present invention of a hardware configuration of IVR system 102 (FIG. 1) which is representative of a hardware environment for practicing the present invention. Referring to FIG. 2, IVR system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for utilizing the caller waiting time to gain valuable information about the provider's or competitor's products or services which is used to generate social media content as discussed further below in connection with FIGS. 3A-3B.

Referring again to FIG. 2, read-only memory ("ROM") 205 is coupled to system bus 202 and includes a basic input/output system ("BIOS") that controls certain basic functions of IVR system 102. Random access memory ("RAM") 206 and disk adapter 207 are also coupled to system bus 202. It should be noted that software components including operating system 203 and application 204 may be loaded into RAM 206, which may be IVR system's 102 main memory for execution. Disk adapter 207 may be an integrated drive electronics ("IDE") adapter that communicates with a disk unit 208, e.g., disk drive. It is noted that the program for utilizing the caller waiting time to gain valuable information about the provider's or competitor's products or services which is used to generate social media content, as discussed further below in connection with FIGS. 3A-3B, may reside in disk unit 208 or in application 204.

IVR system 102 further includes a communications adapter 209 coupled to bus 202. Communications adapter 209 interconnects bus 202 with an outside network (e.g., networks 103, 105 of FIG. 1) thereby allowing IVR system 102 to communicate with other devices, such as communication devices 101 and social network servers 104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, call centers may use IVR systems to identify and segment callers. The ability to identify customers allows services to be tailored according to the customer profile. At times, the caller can be given the option to wait in the queue. This wait time or hold time is a loss of time for both the caller and the provider of the IVR system (e.g., company). For example, a caller may be attempting to reach a company representative regarding a product or service sold by the company. During the time that the caller is waiting to speak with a company representative, valuable time is wasted for both the caller and the company resulting in a loss of opportunity for the provider of the IVR system to gain valuable information about the provider's or competitor's products or services. If, however, the caller waiting time could be utilized by the provider of the IVR system to learn more about the provider's or competitor's products or services, then the caller waiting time would not be a missed opportunity for the provider of the IVR system.

The principles of the present invention provide a means for utilizing the caller waiting time for the provider of the IVR system to gain valuable information about the provider's or competitor's products or services. Such valuable information may be used to generate social media content which is posted on a social media stream for the benefit of the provider of the IVR system and the customers or potential customers of the provider of the IVR system as discussed below in connection with FIGS. 3A-3B.

Figure 3A:
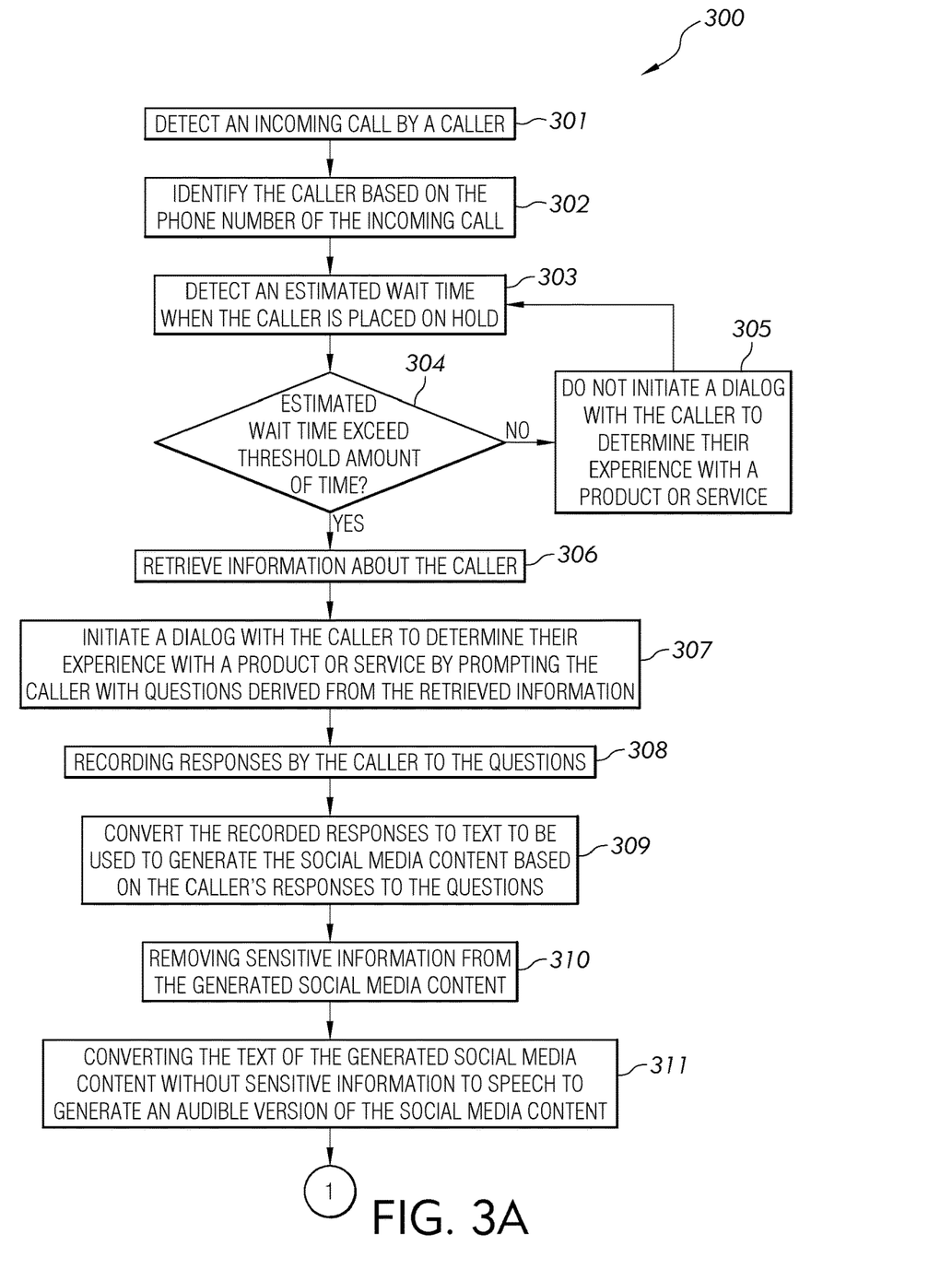
FIGS. 3A-3B are a flowchart of a method for utilizing the caller waiting time for the provider of the IVR system to gain valuable information about the provider's or competitor's products or services which is used to generate social media content in accordance with an embodiment of the present invention.
Figure 3B:
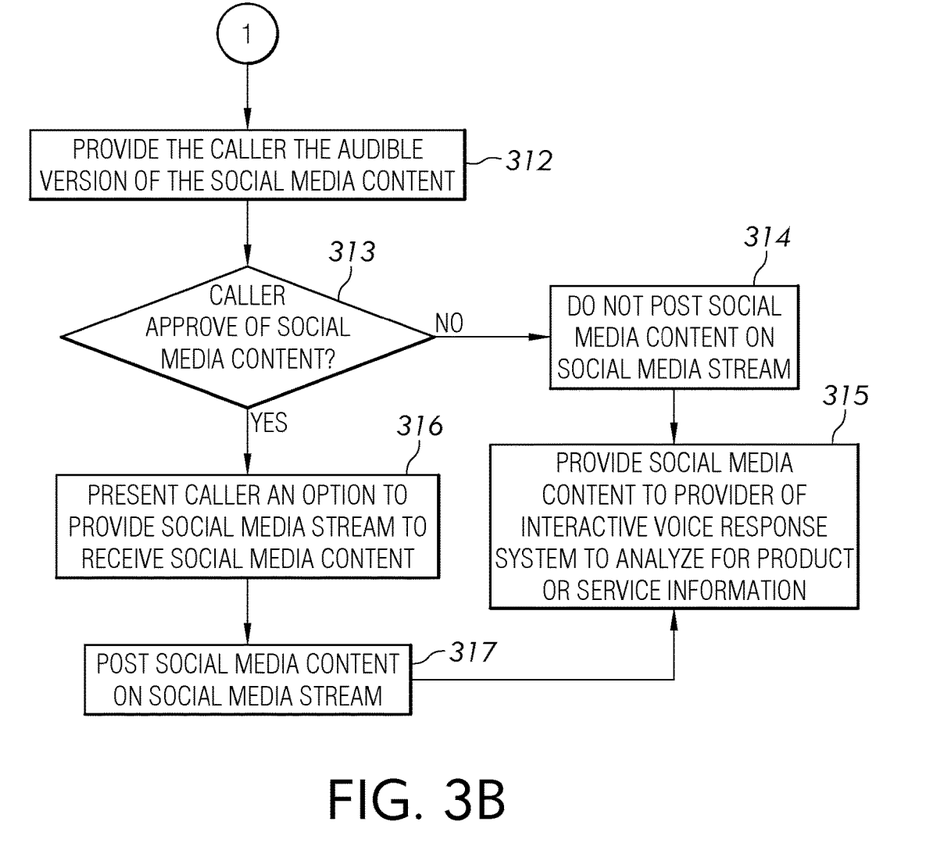

FIGS. 3A-3B are a flowchart of a method 300 for utilizing the caller waiting time for the provider of the IVR system 102 (FIG. 1) to gain valuable information about the provider's or competitor's products or services which is used to generate social media content in accordance with an embodiment of the present invention.

Referring to FIG. 3A, in conjunction with FIGS. 1-2, in step 301, IVR system 102 detects an incoming call by a caller (i.e., user of communication device 101).

In step 302, IVR system 102 identifies the caller based on the phone number of the incoming call. For example, the caller could be identified by IVR system 102 performing a reverse phone lookup, such as via an online tool, such as Whitepages™. In another embodiment, IVR system 102 identifies the caller by searching for a matching phone number (phone number of the incoming call) in the customer profiles stored in database 106. Each customer profile may store information about the customer of the provider of IVR system 102, such as name, address, phone number, etc. As a result, if the caller is a customer of the provider of IVR system 102, then the caller may be identified based on the caller's phone number.

In step 303, IVR system 102 determines an estimated wait time when the caller is placed on hold. In one embodiment, IVR system 102 determines the estimated wait time based on one or more of the following factors: the number of callers placed in queue, the number of service representatives to assist callers, and the average amount of time previous callers have waited to be serviced.

In step 304, a determination is made by IVR system 102 as to whether the estimated wait time exceeds a threshold amount of time.

If the estimated wait time does not exceed the threshold amount of time, then, in step 305, IVR system 102 does not initiate a dialog with the caller to determine their experience with a product or service, such as a product or service of the provider of IVR system 102 or a product or service of a competitor of the provider.

If, however, the estimated wait time exceeds the threshold amount of time, then, in step 306, IVR system 102 retrieves information about the caller. Such information may pertain to the caller's previous purchases of products or services sold by the provider of IVR system 102 or a competitor of the provider. In one embodiment, information about the caller's previous purchases of products or services from the provider of IVR system 102 may be obtained from a profile of the caller stored in database 106. As discussed above, information about the caller, such as name, address and phone number as well as previous purchases may be stored in database 106.

In another example, information about the caller's previous purchases of products or services from the provider of IVR system 102 or competitors of the provider may be obtained from social networking websites (e.g., Facebook®, Twitter®). In one embodiment, IVR system 102 utilizes natural language processing to identify the caller's previous purchases of products or services from the provider of IVR system 102 or competitor of the provider. For example, the caller may have posted a comment on a social networking website about a recent purchase of a toy from the provider of IVR system 102 or a competitor of the provider. The toy purchased by the caller could be identified in the post based on the name of the toy or the name of the toy cited in connection with the name of the provider or competitor. In one embodiment, IVR system 102 identifies products or services based on a listing of products and services provided to IVR system 102, such as the names of products and services offered by the provider of IVR system 102 and competitors of the provider. For example, in the post "Just bought Go! Go! Smart Wheels® Treasure Mountain Train Adventure™ by Vtech® for my son Tommy," IVR system 102 could identify the name of the product ("Go! Go! Smart Wheels® Treasure Mountain Train Adventure™") via natural language processing using a prior listing of products sold by various companies.

In step 307, IVR system 102 initiates a dialog with the caller to determine their experience with a product or service by prompting the caller with questions derived from the retrieved information. A "dialog," as used herein, refers to an audio conversation initiated by IVR system 102 with the caller to extract opinions from the caller pertaining to products or services offered by the provider of IVR system 102 or the provider's competitors. Such a dialog may include questions, such as, would the caller recommend the product or service to a friend, words to describe the product or service, how does the product or service compare to a competitor's product or service, what changes the caller would make to the product or service, what does the caller like best about the product or service, what does the caller dislike the most about the product or service, what features the caller liked and disliked, etc. In one embodiment, IVR system 102 uses text-to-speech processing and natural language processing to generate audible questions by using scripts that are pre-programmed for the voice site, for example, voice-extensible markup language (VoiceXML) scripts.

In step 308, IVR system 102 records the responses (audio responses) by the caller to the questions.

In step 309, IVR system 102 converts the recorded responses to text to be used to generate the social media content based on the caller's responses to the questions. In one embodiment, IVR system 102 uses speech-to-text processing to generate social media content to be posted on a social media stream. Such social media content may include the caller's evaluation of a product or service of the provider of IVR system 102 or a competitor of the provider. For example, the social media content may include the features of the product or service that the caller liked as well as the advantages of the provider's product or service in comparison to the competitor's product or service.

In step 310, IVR system 102 removes sensitive information from the generated social media content. For example, IVR system 102 removes sensitive information, such as sensitive personal information, personally identifiable information or health information, such as health information subject to the Health Insurance Portability and Accountability Act. In one embodiment, after removing the sensitive information from the generated social media content, the social media content is queued until user 101 approves the posting of the social media content onto a social media stream. Furthermore, in one embodiment, a technical expert, such as in privacy, reviews the generated social media content to ensure that the sensitive information has been removed from the generated social media content.

In step 311, IVR system 102 converts the text of the generated social media content without the sensitive information to speech to generate an audible version of the social media content. In one embodiment, IVR system 102 uses text-to-speech processing to generate an audible version of the social media content in step 311.

Referring now to FIG. 3B, in conjunction with FIGS. 1-2, in step 312, IVR system 102 provides the caller the audible version of the social media content to determine if the caller approves posting the social media content on a social media stream. In one embodiment, the caller is provided an opportunity to modify the audible version of the social media content prior to approval. If the caller approves the posting of the modified audible version of the social media content, then, in one embodiment, IVR system 102 generates a new version of the social media content to be posted on a social media stream using speech-to-text processing.

In step 313, a determination is made by IVR system 102 as to whether the caller approved of posting the social media content on a social media stream. In one embodiment, the approval of posting the social media content is based on the approval of multiple users. In such an embodiment, these other users may also be provided an audible version of the social media content. Furthermore, such other users may be other customers of the provider of IVR system 102, including those who purchased the same product or service discussed in the social media content. In one embodiment, these other users who are customers of the provider of IVR system 102 may be identified from the provider's customer profiles stored in database 106.

If the caller or multiple users do not approve the posting of the social media content on a social media stream, then, in step 314, IVR system 102 does not post the social media content on a social media stream.

In step 315, IVR system 102 provides the social media content to the provider of IVR system 102 to analyze for product or service information. For example, the provider of IVR system 102 may utilize natural language processing to analyze the social media content to obtain data points in the social media content, such as the caller's evaluation of the product or service. For instance, if the caller has used terms, such as "good," "fun," "loves," to describe the product or service, then the caller had a positive evaluation about the product or service.

If, however, the caller (or multiple users in the alternative embodiment) approves the posting of the social media content on a social media stream, then, in step 316, IVR system 102 presents the caller an option to provide the social media stream to receive the social media content. For example, the caller may indicate to post the generated social media content on Twitter® on behalf of the caller.

In step 317, IVR system 102 posts the social media content on a social media stream. In one embodiment, the social media stream may be specified by the caller. In one embodiment, the social media stream may be selected based on information provided in the caller's profile, which may include social networking websites used by the caller. In another embodiment, the social media stream may be inferred from information retrieved about the caller in step 306. In another embodiment, the social media stream may be selected based on information gathered from social media (e.g., social networking websites used by the caller). In another embodiment, the social media stream may be an anonymized stream.

In this manner, the caller's waiting time is utilized to gain valuable information about the provider's (or competitor of the provider) products or services, which is used to generate social media content that is posted on a social media stream for the benefit of the provider of the IVR system and the customers or potential customers of the provider of the IVR system.

After posting the social media content on a social media stream, IVR system 102 provides the social media content to the provider of IVR system 102 to analyze for product or service information in step 315.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for utilizing a caller wait time, the method comprising:
   detecting an incoming call by a caller;
   identifying said caller based on a phone number of said incoming call;
   determining an estimated wait time when said caller is placed on hold based on a number of callers placed in queue, a number of service representatives to assist callers and/or an average amount of time previous callers have waited to be serviced;
   retrieving information about said caller in response to said estimated wait time exceeding a threshold amount of time;
   initiating a dialog with said caller to determine their experience with a product or service by prompting said caller with questions derived from said retrieved information, wherein said dialog is an audio conversation initiated by an interactive voice response system to extract options from said caller pertaining to products or services, wherein text-speech processing and natural language processing are used to generate said questions by using scripts that are pre-programmed for a voice site;

recording responses by said caller to said questions;

generating social media content based on said caller's responses to said questions using speech-to-text processing;

providing said caller an audible version of said social media content; and posting said social media content on a social media stream in response to said caller approving said posting of said social media content after listening to said audible version of said social media content.

2. The method as recited in claim 1 further comprising:

removing sensitive information from said generated social media content.

3. The method as recited in claim 1, wherein said information about said caller is retrieved from a profile of said caller or a social networking website.

4. The method as recited in claim 1, wherein said social media stream is selected from the group consisting of the following sources: said caller, said retrieved information about said caller, a profile of said caller and social media.

5. The method as recited in claim 1 further comprising:

providing said social media content to a provider of said interactive voice response system to analyze for product or service information.

6. The method as recited in claim 5, wherein said social media content is analyzed using natural language processing to obtain data points in said social media content.

7. The method as recited in claim 1 further comprising:

posting said social media content on said social media stream in response to said caller and one or more other users approving said posting of said social media content.

8. A computer program product for utilizing a caller wait time, the computer program product comprising a computer readable storage medium having program code embodied therewith, the program code comprising the programming instructions for:

detecting an incoming call by a caller;

identifying said caller based on a phone number of said incoming call;

determining an estimated wait time when said caller is placed on hold based on a number of callers placed in queue, a number of service representatives to assist callers and/or an average amount of time previous callers have waited to be serviced;

retrieving information about said caller in response to said estimated wait time exceeding a threshold amount of time;

initiating a dialog with said caller to determine their experience with a product or service by prompting said caller with questions derived from said retrieved information, wherein said dialog is an audio conversation initiated by an interactive voice response system to extract options from said caller pertaining to products or services, wherein text-speech processing and natural language processing are used to generate said questions by using scripts that are pre-programmed for a voice site;

recording responses by said caller to said questions;

generating social media content based on said caller's responses to said questions using speech-to-text processing;

providing said caller an audible version of said social media content; and posting said social media content on a social media stream in response to said caller approving said posting of said social media content after listening to said audible version of said social media content.

9. The computer program product as recited in claim 8, wherein the program code further comprises the programming instructions for:

removing sensitive information from said generated social media content.

10. The computer program product as recited in claim 8, wherein said information about said caller is retrieved from a profile of said caller or a social networking website.

11. The computer program product as recited in claim 8, wherein said social media stream is selected from the group consisting of the following sources: said caller, said retrieved information about said caller, a profile of said caller and social media.

12. The computer program product as recited in claim 8, wherein the program code further comprises the programming instructions for:

providing said social media content to a provider of said interactive voice response system to analyze for product or service information.

13. The computer program product as recited in claim 12, wherein said social media content is analyzed using natural language processing to obtain data points in said social media content.

14. The computer program product as recited in claim 8, wherein the program code further comprises the programming instructions for:

posting said social media content on said social media stream in response to said caller and one or more other users approving said posting of said social media content.

15. A system, comprising:

a memory for storing a computer program for utilizing a caller wait time; and a processor connected to said memory, wherein said processor is configured to execute the program instructions of the computer program comprising:

detecting an incoming call by a caller;

identifying said caller based on a phone number of said incoming call;

determining an estimated wait time when said caller is placed on hold based on a number of callers placed in queue, a number of service representatives to assist callers and/or an average amount of time previous callers have waited to be serviced;

retrieving information about said caller in response to said estimated wait time exceeding a threshold amount of time;

initiating a dialog with said caller to determine their experience with a product or service by prompting said caller with questions derived from said retrieved information, wherein said dialog is an audio conversation initiated by an interactive voice response system to extract options from said caller pertaining to products or services, wherein text-speech processing and natural language processing are used to generate said questions by using scripts that are pre-programmed for a voice site;

recording responses by said caller to said questions;

generating social media content based on said caller's responses to said questions using speech-to-text processing;

providing said caller an audible version of said social media content; and posting said social media content on a social media stream in response to said caller approving said posting of said social media content after listening to said audible version of said social media content.

16. The system as recited in claim 15, wherein the program instructions of the computer program further comprise:

removing sensitive information from said generated social media content.

17. The system as recited in claim 15, wherein said information about said caller is retrieved from a profile of said caller or a social networking web site.

18. The system as recited in claim 15, wherein said social media stream is selected from the group consisting of the following sources: said caller, said retrieved information about said caller, a profile of said caller and social media.

19. The system as recited in claim 15, wherein the program instructions of the computer program further comprise:

providing said social media content to a provider of said interactive voice response system to analyze for product or service information.

20. The system as recited in claim 19, wherein said social media content is analyzed using natural language processing to obtain data points in said social media content.

* * * * *